United States Patent [19]

Rogers, Jr.

[11] 4,445,604
[45] May 1, 1984

[54] CLUTCH DRIVE FOR POWER BELT SYSTEM

[75] Inventor: Lloyd W. Rogers, Jr., Utica, Mich.

[73] Assignee: General Motors Corporation, Detroit, Mich.

[21] Appl. No.: 348,916

[22] Filed: Feb. 16, 1982

[51] Int. Cl.³ .................. F16D 43/16; B60R 21/10
[52] U.S. Cl. ........................... 192/71; 192/103 B; 192/105 CD; 280/804; 297/477; 74/89.21
[58] Field of Search .............. 192/105 CD, 103 B, 71; 280/804; 297/483, 477; 74/89.21

[56] References Cited

U.S. PATENT DOCUMENTS

| | | | |
|---|---|---|---|
| 2,463,100 | 3/1949 | Gredell | 192/105 CD X |
| 3,182,923 | 5/1965 | Botar | 297/477 X |
| 3,386,544 | 6/1968 | Matsuda | 192/71 X |
| 3,416,746 | 8/1969 | Schwerdhöfer | 192/103 B X |
| 3,557,922 | 1/1971 | Schwerdhöfer | 192/103 B X |
| 3,680,883 | 8/1972 | Keppel et al. | 280/150.5 B |
| 3,693,771 | 9/1972 | DeLancey | 192/103 B X |
| 3,742,781 | 7/1973 | Boyriven | 74/625 |
| 3,757,472 | 9/1973 | Rogakos | 49/139 X |
| 4,061,365 | 12/1977 | Nagano et al. | 280/804 |
| 4,191,068 | 3/1980 | Jardin et al. | 74/625 |
| 4,251,091 | 2/1981 | Weissner et al. | 280/804 |
| 4,313,622 | 2/1982 | Suzuki et al. | 280/804 |
| 4,316,619 | 2/1982 | Suzuki et al. | 280/804 |
| 4,317,583 | 3/1982 | Pilhall | 280/804 |
| 4,359,236 | 11/1982 | Rogers, Jr. | 297/483 X |

FOREIGN PATENT DOCUMENTS 708543  7/1931  France ............. 192/105 CD

*Primary Examiner*—Rodney H. Bonck
*Assistant Examiner*—David D. House
*Attorney, Agent, or Firm*—Charles E. Leahy

[57] ABSTRACT

A belt carriage is movable along a vehicle body mounted track to move an occupant restraint belt between an occupant restraint position and a stowed position permitting occupant ingress and egress. A plastic drive tape is attached to the carriage and has perforations which mesh with a toothed tape drive gear for driving the drive tape and carriage back and forth along the track. An electric motor and a speed reduction gear unit are connected to the tape drive gear by a clutch which couples with the drive gear only when the electric motor is energized so that whenever the electric motor is not energized the occupant may grip the belt carriage and manually move the belt carriage and the drive tape to move the restraint belt between the occupant restraint and stowed positions independently of the motor. The clutch is preferably a centrifugal clutch in which clutch pawls are thrown outwardly by centrifugal force to engage with the tape drive gear when the motor is energized.

3 Claims, 4 Drawing Figures

CLUTCH DRIVE FOR POWER BELT SYSTEM

CLUTCH DRIVE FOR POWER BELT SYSTEM

The invention relates to a motor vehicle occupant restraint belt system having a belt carriage movable along a track by a motor-driven drive element and more particularly provides a centrifugal clutch providing the driving connection between the motor and the drive element so that the occupant may manually move the belt carriage along the track independently of energization of the motor.

BACKGROUND OF THE INVENTION

It is well known in motor vehicle passive occupant restraint systems to provide a belt carriage which is movable along a track by a motor-driven drive element to move the restraint belt between an occupant restraining position and a stowed position permitting occupant ingress and egress. A speed reduction gear unit is conventionally employed in connection with the electric motor and the drive element in order to provide the desired relatively low speed of movement of the carriage along the track.

In the event of malfunction of the drive motor or of the electrical control circuit therefor, the carriage will come to rest and accordingly the belt will remain poised in either the restraining position or the stowed position. It would be desirable to provide some arrangement by which the occupant may effect a manual movement of the belt carriage along the track. However, it is very difficult to effect such manual carriage movement because the speed reduction gear unit is not conductive to forced reverse rotation.

The present invention provides an improvement in the prior known motor-driven belt carriage systems by the provision of a centrifugal clutch mechanism providing the drive coupling between the motor-driven speed reduction gear unit and the belt carriage drive element so that the drive element is uncoupled except when the motor is energized to enable manual movement of the belt carriage along the track.

SUMMARY OF THE INVENTION

A belt carriage is movable along a vehicle body mounted track to move an occupant restraint belt between an occupant restraint position and a stowed position permitting occupant ingress and egress. The drive element is preferably a plastic drive tape which is attached to the carriage and has perforations which mesh with a tooth drive gear for driving the drive tape and carriage back and forth along the track. An electric motor and a speed reduction gear unit are connected to the drive gear by a clutch which couples with the drive gear only when the electric motor is energized so that whenever the electric motor is not energized the occupant may manually move the belt carriage and the drive element and the drive gear to move the restraint belt between the occupant restraint and stowed positions independently of the motor. The clutch is preferably a centrifugal clutch in which clutch pawls are thrown outwardly by centrifugal force when the motor is energized to enhance clutch teeth provided on the drive gear.

The object, feature and advantage of the invention resides in the provision of a clutch coupling the electric motor with a drive gear driving a seat belt carriage so that whenever the electric motor is not energized the occupant may effect manual movement of the belt carriage and the drive element and drive gear independently of the motor to move the restraint belt between the occupant restraint and stowed positions in the event of failure of the motor.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
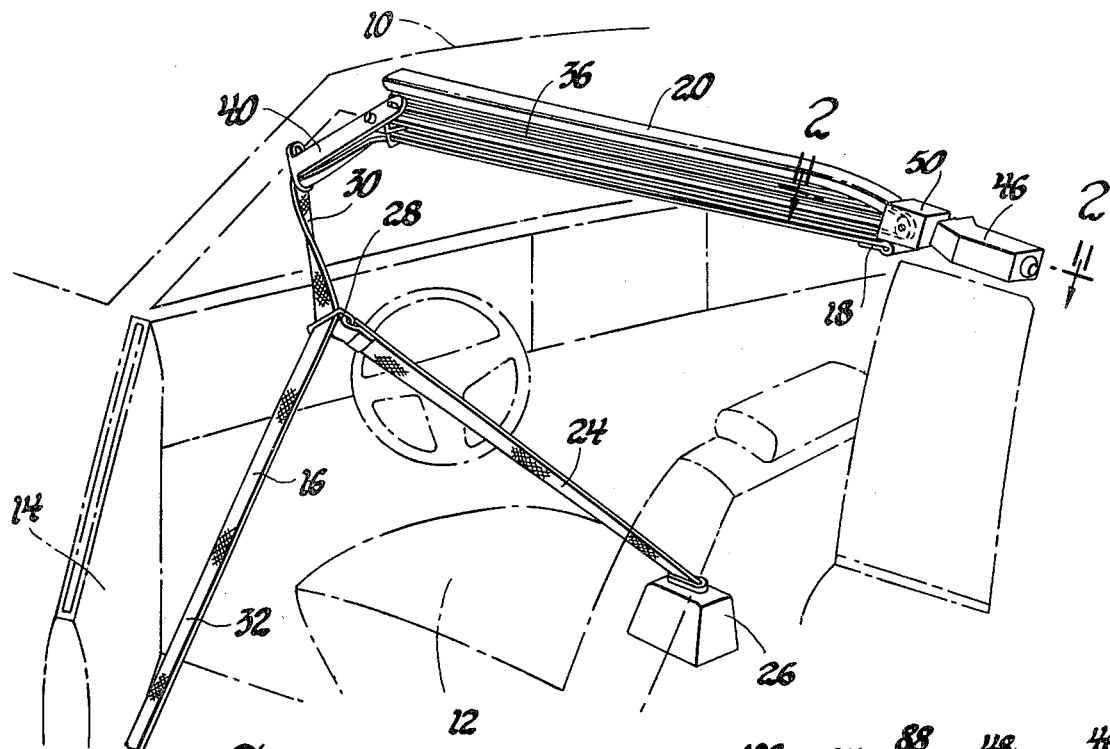
FIG. 1 is a perspective view of a passive seat belt system showing the belt carriage having been moved forwardly along the track to establish the restraint belt in the stowed position facilitating occupant ingress and egress.

Referring to FIG. 1 there is shown a vehicle body 10 having an occupant seat 12 located laterally adjacent a door opening. A door 14 is hingedly mounted on the vehicle body for swinging movement between the open position of FIG. 1 and a closed position.

A passive occupant restraint system for restraining an occupant in a seat 12 includes a restraint belt 16 having an upper end 18 suitably connected to the roof rail 20 generally above and behind the door opening. The lower end of the restraint belt 16 is attached to the lower rear corner of the door by a suitable anchorage, not shown. A control belt 24 has an inboard end which is retractably mounted by a control belt retractor 26 suitably mounted on the vehicle body inboard the occupant seat 12. The retractor 26 is preferably of the vehicle inertia sensitive type which is locked by a pendulum or other inertia responsive member upon occurrence of a predetermined level of vehicle deceleration. A junction ring 28 is attached to the outboard end of the control belt 24 and slidably encircles the restraint belt 16 to divide the restraint belt 16 into a shoulder belt portion 30 and a lap belt portion 32.

As best seen in FIG. 1, a track extends longitudinally along the roof rail 20. The track 36 includes a roll formed sheet steel track which mounts a belt carriage assembly 40 for fore and aft movement along the track. Furthermore, the track 36 captures a drive element, best seen in FIG. 2, which is a plastic drive tape 42. The track 36 mounts the drive tape 42 for fore and aft movement along the track. The drive tape 42 is suitably attached to the carriage assembly 40. Reference may be had to U.S. Pat. application Ser. No. 199,005, filed October 20, 1980, for a more detailed description of the track 36 and the belt carriage assembly 40.

Figure 2:
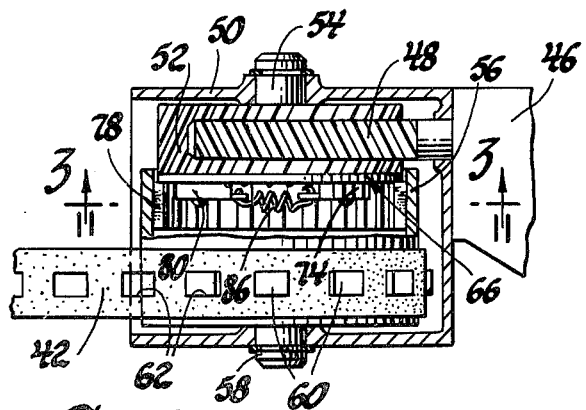
FIG. 2 is a sectional view taken in the direction of arrows 2—2 of FIG. 1 showing a section through the power drive mechanism.
Figure 3:
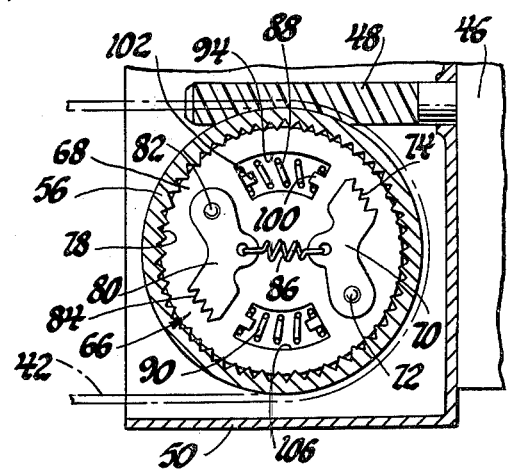
FIG. 3 is a sectional view taken in the direction of arrows 3—3 of FIG. 2 and showing the centrifugal clutch mechanism.
Figure 4:
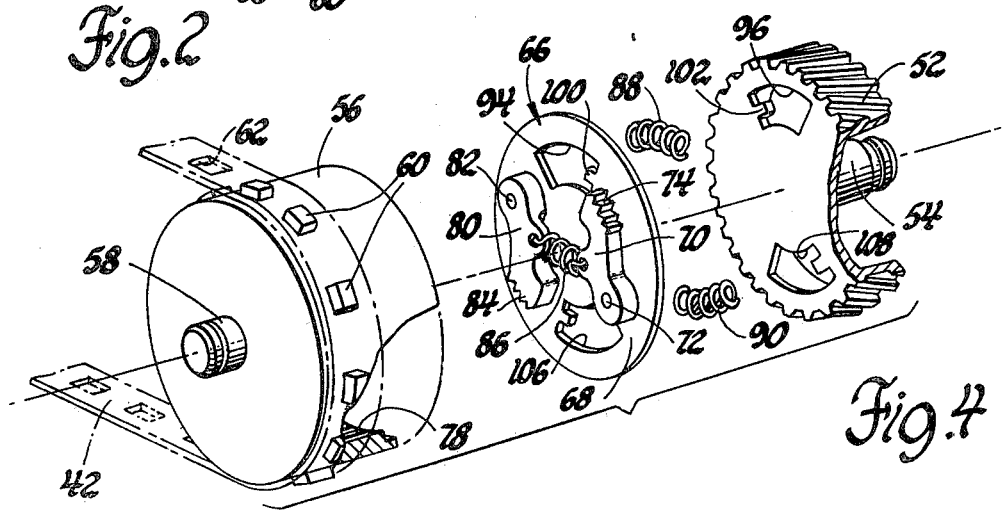
FIG. 4 is an exploded view showing the tape drive gear, the centrifugal clutch and the helical speed reduction gear.

Referring again to FIG. 1, it is seen that a motor and drive mechanism is mounted on a roof rail 20 for powering the fore and aft movement of the drive tape 42 as will be described hereinafter in reference to FIGS. 2, 3 and 4. Referring to FIG. 2 it is seen that an electric motor 46 rotatably drives a worm shaft 48 which projects into a transmission housing 50. A worm gear 52 is rotatably mounted on the housing 50 by a shaft 54 and meshes with the worm shaft 48 for rotation thereby. A tape drive gear 56 is also mounted on the housing 50 by a shaft 58. The outer circumference of the tape drive gear 56 carries radially spaced teeth 60 which mesh with rectangular perforations 62 provided on the drive tape 42. Accordingly, rotation of the tape drive gear 56 will translate the tape drive 42 along the track 36 to move the belt carriage 40.

The worm gear 52 and the tape drive gear 56 are coupled by a centrifugal clutch generally indicated at 66. The centrifugal clutch includes a clutch plate 68 which has a clutch pawl 70 pivotally mounted thereon by a pin 72. The clutch pawl 70 has clutch teeth 74 which face outwardly in spaced relation from mating internal teeth 78 provided on the interior wall of the tape drive gear 56. A like clutch pawl 80 is pivotally mounted on the clutch plate 68 by a pin 82 and has teeth 84 which face toward the internal teeth 78 of the tape drive gear 56. A coil tension spring 86 acts between the clutch pawls 70 and 80 to normally hold the pawls in their normal positions of FIGS. 3 and 4 spaced radially away from the internal teeth 78 of the tape drive gear 56. The clutch plate 68 is coupled to the worm gear 52 by shock absorbing coil compression springs 88 and 90. The spring 88 seats in aligned apertures 94 and 96 of the clutch plate 68 and the worm gear 52. Clutch plate 68 has a tab 100 which seats in one end of the spring 88 and the worm gear 52 has an opposed facing tab 102 which seats in the opposite end of the spring 88. The shock absorbing spring 90 is likewise seated in aligned apertures 106 and 108 of the clutch plate 68 and worm gear 52.

OPERATION

When the motor 46 is not energized, the worm shaft 48 and worm gear 52 are at rest. The clutch pawls 70 and 80 are held at their normal position of FIG. 3 by the spring 86 so that the clutch teeth 74 and 84 are disengaged from the internal teeth 78 of the tape drive gear 56. Accordingly, the occupant may grip the carriage assembly 40 and pull the carriage rearwardly from the position of FIG. 1. During such rearward movement of carriage 40 the drive tape 42 traverses the track 36 and rotates the tape drive gear 56.

Whenever the motor 46 is energized the worm shaft 48 rotates at a high speed and rotates the worm gear 52 at a low speed. The clutch plate 68 is coupled to the worm gear 52 by the shock absorbing springs 88 and 90. The clutch pawls 70 and 80 are thrown radially outward by centrifugal force so that their clutch teeth 74 and 84 mesh with internal teeth 78 provided on the tape drive gear 56. Accordingly the tape drive gear 56 is coupled with the worm gear to translate the drive tape 42 and the carriage 40 back and forth along the track 36.

Thus, it is seen that the invention provides a clutch which normally disconnects the tape drive gear 56 from the motor 46 to enable manual movement of the carriage 40 along the track 36.

While the invention has been disclosed primarily in terms of a specific embodiment shown in the drawings, it is not intended to be limited thereto but rather only to the extent set forth in the appended claims. For example, the clutch selectively coupling the motor with the tape drive gear may be electrically operated such that the clutch couples the tape drive gear with the motor only when the motor is electrically energized.

The embodiments of the invention in which an exclusive property or privilege is claimed are defined as follows:

1. In combination with a motor vehicle passive occupant restraint belt system having a belt carriage movable along a track by a motor-driven drive element to move the belt between an occupant restraint position and a stowed position permitting occupant ingress and egress, a motor drive mechanism for driving the drive element comprising:

an electric motor;
   a drive gear coupled with the drive element for driving the drive element in one direction to move the belt to the restraint position and in the other direction to move the belt to the stowed position;
   and clutch means acting between the electric motor and the drive gear, said clutch means acting to couple the electric motor with the drive gear only when the electric motor is energized whereby when the electric motor is not energized the occupant may manually grip the belt carriage to effect manual movement of the belt carriage and the drive element and the drive gear to move the restraint belt between the occupant restraint and the stowed positions in the event of failure to energize the electric motor.

2. In combination with a motor vehicle passive occupant restraint belt system having a belt carriage movable along a track by a motor-driven drive element to move the belt between an occupant restraint position and a stowed position permitting occupant ingress and egress, a motor drive mechanism for driving the drive element comprising:

a drive gear coupled with the drive element for driving the drive element in one direction or the other along the track upon corresponding rotation of the drive gear;
   an electric motor;
   a gear speed reduction unit including a worm shaft driven by the motor and worm gear driven by the worm shaft; and
   a centrifugal clutch means acting between the worm gear and the drive gear, said centrifugal clutch means including a clutch pawl mounted for rotation with the worm gear and having a toothed end normally spaced from mating teeth carried by the drive gear so that the worm gear is normally uncoupled from the drive gear to permit manual movement of the belt carriage and the drive element by the occupant to manually move the belt between the restraint and stowed positions, the rotation of the worm gear and the worm shaft upon energization of the motor causing the clutch pawl to be moved radially outward by centrifugal force to engage the clutch pawl teethed end with the mating teeth of the drive gear to couple the motor to the drive gear to affect power movement of the belt carriage between the restraint position and the stowed position.

3. In combination with a motor vehicle passive occupant restraint belt system having a belt carriage movable along a track to move the belt between an occupant restraint position and a stowed position permitting occupant ingress and egress, a mechanism for driving the carriage along the track comprising:

a plastic drive tape captured by the track for movement therealong and attached to the carriage, the drive tape having regularly spaced rectangular apertures therein;

a tape drive gear having spaced rectangular teeth for meshing engagement with the apertures of the plastic drive tape to move the belt carriage back and forth along the track upon rotation of the tape drive gear;

an electric motor;

a speed reduction gear unit driven by the motor to affect reduction of motor speed; and centrifugal clutch means acting between the gear reduction unit and the tape drive gear, said centrifugal clutch means being effective upon rotation of the speed reduction gear unit to couple with the tape drive gear and thereby move the belt carriage along the track, said centrifugal clutch means normally uncoupling the tape drive gear from the gear reduction unit to permit the occupant to manually move the carriage back and forth along the track as permitted by the rotation of the tape drive gear.

* * * * *